United States Patent
Wang et al.

(10) Patent No.: US 6,721,567 B1
(45) Date of Patent: Apr. 13, 2004

(54) APPARATUS, AND AN ASSOCIATED METHOD, FOR SELECTING A LIKELY TARGET CELL IN A CELLULAR COMMUNICATION SYSTEM

(75) Inventors: Shu-Shaw (Peter) Wang, Arlington, TX (US); Rene W. Purnadi, Coppell, TX (US); Liangchi Hsu, Arlington, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/539,148

(22) Filed: Mar. 30, 2000

(51) Int. Cl.$^7$ ................................................ H04Q 7/20
(52) U.S. Cl. ..................... 455/440; 455/436; 455/441
(58) Field of Search ............................. 455/436, 437, 455/438, 435, 440, 441, 456, 449, 450, 452, 453, 524, 525, 422.1, 403, 456.1; 370/331, 328, 329

(56) References Cited

U.S. PATENT DOCUMENTS

| | | | | |
|---|---|---|---|---|
| 5,530,693 A | * | 6/1996 | Averbuch et al. | 370/331 |
| 5,657,487 A | * | 8/1997 | Doner | 455/456 |
| 6,052,598 A | * | 4/2000 | Rudrapatna et al. | 455/456 |
| 6,147,983 A | * | 11/2000 | Backstrom | 370/330 |
| 6,311,065 B1 | * | 10/2001 | Ushiki et al. | 455/440 |
| 6,381,463 B1 | * | 4/2002 | Tu et al. | 455/456 |
| 6,385,454 B1 | * | 5/2002 | Bahl et al. | 455/450 |
| 6,438,376 B1 | * | 8/2002 | Elliott et al. | 455/437 |

FOREIGN PATENT DOCUMENTS

| | | |
|---|---|---|
| EP | 0 690 650 A2 | 1/1996 |
| EP | 1 081 974 A2 | 3/2001 |
| WO | WO 97/47150 | 12/1997 |
| WO | WO 99/04511 | 1/1999 |
| WO | WO 99/41925 | 8/1999 |

* cited by examiner

*Primary Examiner*—Sonny Trinh
(74) *Attorney, Agent, or Firm*—Federico Fraccaroli

(57) ABSTRACT

Apparatus, and an associated method, for allocating resources at a target cell, or cells, of a cellular communication system. Determinations are made of the positioning and of the velocity, of a mobile station. Predictions of a target cell and when a handover is likely to be requested are made. Responsive thereto, a request is made prior to a handover request for the allocation of resources to permit the continued effectuation of a communication service upon handover of communications to the target cell.

18 Claims, 2 Drawing Sheets

APPARATUS, AND AN ASSOCIATED METHOD, FOR SELECTING A LIKELY TARGET CELL IN A CELLULAR COMMUNICATION SYSTEM

The present invention relates generally to a manner by which to maintain communication quality levels at a desired level in a radio communication system when communications with a mobile station are handed-off from a serving cell to a target cell. More particularly, the present invention relates to apparatus, and an associated method, by which to select a cell likely to become a target cell based upon movement of the mobile station within the serving cell, prior to a request for a hand-off of communications to a target cell. Once the likely target cell is selected, resources at the likely target cell are reserved, thereby to ensure better that the resources are available, subsequent the handover, to maintain communications at the desired communication quality level.

BACKGROUND OF THE INVENTION

Communication signals communicated between a sending station and a receiving station of a communication system provide for the communication of information between the sending station and the receiving station. The sending station and the receiving station are interconnected by way of a communication channel upon which the communication signal is communicated. The communication signals formed by the sending station are of characteristics to permit their transmission upon the communication channel. And, when the communication signal is received at the receiving station, the receiving station recreates the informational content contained in the communication signal.

When the communication channel is formed of a radio channel defined upon a portion of the electromagnetic spectrum, the communication system is referred to as a radio communication system. A wireline connection is not required to interconnect the sending station and a receiving station in a radio communication system; therefore, communications are possible in a radio communication system even when a wireline connection formed between the sending and receiving stations would be impractical.

A cellular communication system is an exemplary type of radio communication system. Various cellular communication standards have been promulgated, and cellular communication systems have been implemented pursuant to such promulgated standards. And, additional cellular communication systems continue to be proposed and improvements to existing cellular communication systems have similarly also been proposed.

Generally, a cellular communication system typically includes a network infrastructure including fixed-site, base transceiver stations positioned at spaced intervals throughout a geographic area. Each of the base stations defines a coverage area, referred to as a cell, within which radio communications with a mobile station are possible. The mobile station typically is movable such that the mobile station might initially be positioned in a first cell, referred to as a serving cell, and thereafter be repositioned in another cell, referred to as a target cell. Handover of communication with the mobile station from the base station encompassing the serving cell to the base station encompassing the target cell permits continued communications with the mobile station.

For a handover of communications from the serving cell to the target cell to be effectuated, however, resources must be available at the target cell. Resources refer, amongst other things, to radio channel allocations to permit the effectuation of a communication service with the mobile station. If the radio channels are being used to effectuate communications with other mobile stations, radio channel capacity might not be available to permit communications to be handed off from the serving cell to the target cell with the mobile station entering the target cell. In such an occurrence, handover of communications to the target cell might not be permitted. Or, if handover is permitted, the communication service might be required to be performed at a degraded quality of service level. If an attempt is made to effectuate the communication service at a degraded quality of service level, a noticeable diminution of quality of the communication service might occur.

By earlier requesting reservation of the resources at the target cell, the likelihood that the resources shall become available at the target cell by the time when handover is to occur is increased. Thereby, one manner by which better to ensure that resources shall be available at a target cell to permit continuation of a communication service at a desired quality of service level would be to reserve such resources at every cell which could possibly form the target cell. However, reserving resources at every possible target cell would be an impractical solution in many situations. Reserving resources at cells likely to form target cells would, in contrast, increase the likelihood that the resources would be available at the target cell when a handover is to occur without unduly reserving resources at the cells which do not become the target cell.

If a manner could be provided, therefore, to determine which cell, or cells, are likely to be the target cell, or cells, improved communication in the cellular, or other radio, communication system would be possible. Responsive to a determination of the likely target cell, or cells, a request could be made to reserve the resources at the likely target cell, or cells, better to ensure that the resources shall be available at the cell when a handover of communications is to be effectuated.

It is in light of this background information related to communications in a cellular, or other radio, communication system that the significant improvements of the present invention have evolved.

SUMMARY OF THE INVENTION

The present invention, accordingly, advantageously provides apparatus, and an associated method, to facilitate maintenance of communication quality levels at a desired level in a radio communication system when communications with a mobile station are handed-off from a serving cell to a target cell.

Selection is made of one or more cells likely to become a target cell based upon movement of the mobile station within the serving cell, prior to a request for hand-off of communications to the target cell. By selecting a likely target cell prior to a request for the hand-off of the communications to the target cell, resources at the likely target cell can be reserved, thereby to ensure that the resources shall be available to continue the effectuation of the communication service with the mobile station without degradation of quality levels of the communication service.

In one aspect of the present invention, the mobile station is provided with apparatus to permit determination, at the mobile station, of the positioning of the mobile station. In one implementation, the mobile station includes a GPS (Global Positioning System) receiver operable to receive conventional, global positioning signals generated by GPS satellites. The GPS receiver forming a portion of the mobile station is operable to determine longitudinal and latitudinal positioning of the mobile station responsive to the reception of the GPS signals. By recalculating the positioning of the mobile station in this matter at two or more times, the velocity of the mobile station is further determinable. That is to say, by determining the positioning of the mobile station at separate locations at a known time interval, the speed and heading of the mobile station is readily calculable. Responsive to such measurements and calculations, an estimate can be made both of which cell, or cells, shall likely be a target cell to which handover of communications shall subsequently need to be effectuated and also of when the handover shall likely be necessary. Through such information, a request to reserve resources at a likely target cell can be made and resources can subsequently be allocated thereto so that continued communications at a desired service quality level subsequent to handover of communications is better assured.

In another aspect of the present invention, apparatus is provided for the network infrastructure of the cellular communication system to select one or more cells to be a likely target cell, or cells, to which communications are to be handed-over as a mobile station travels out of a serving cell and into a target cell. The resource reserver receives indications of the positioning of the mobile station and the velocity at which the mobile station is traveling. The resource reserver is also coupled to receive indications of the communication quality level of which a communication service effectuated with the mobile station is being performed. The resource reserver, responsive to the indications of the positioning and velocity of the mobile station, selects a likely target cell, or cells, into which the mobile station shall subsequently travel. Also, responsive to the indications of the positioning and of the velocity of the mobile station, the resource reserver estimates when the mobile station shall likely enter the likely target cell. With further use of the information related to the service quality level at which the communication service is presently being effectuated, or otherwise desired, pursuant to a service subscription of the mobile station to operate in the communication system, the amount, and type, of resources needed to be reserved at the likely target cell is also determinable. Such resources can thereby be requested to permit continuation of effectuation of the communication service at the service quality level subsequent to handover of communications from the serving cell. By early-requesting the resources to be allocated to the mobile station in the likely target cell, the resources are more likely to be allocated to the mobile station, and available for use therewith when a request for handover of communications occurs. As a result, maintenance of the service quality level at which the communication service is desired to be effectuated shall more likely be possible.

In one implementation, an embodiment of the present invention is implementable in an IS-2000, cellular communication system. Such a cellular communication system is to provide for communication services necessitating different levels of communication resources, such as channel bandwidth, for their effectuation. Also, the system sets forth QoS (Quality of Service) levels at which a communication service can, or must, be effectuated. A subscriber to the communication system, for instance, subscribes, pursuant to a service subscription, for a selected level of service. Through operation of an embodiment of the present invention, better assurances are provided that the desired QoS level at which a communication service is effectuated can be maintained when handover of communications with a mobile station occurs. Determinations are made at the mobile station as to the positioning of the mobile station as well as the speed and heading, i.e., the velocity, of the mobile station. Indications of the values of the positioning of the mobile station as well as the velocity thereof are sent, by way of a radio link, to the network infrastructure of the system. The information is sent to the network infrastructure together with a pilot strength measurement (PSMM) signal. A resource reserver located at the base station which forms the serving base station uses the information sent thereto to select a likely target cell to which the mobile station shall likely enter, as well as the time at which the mobile station shall likely enter the target cell. The serving base station also has knowledge of the resource requirements to effectuate the communication service with the mobile station at a selected service quality level. From such information, the resource reserver at the serving base station is able to request from corresponding structure at a target base station to reserve resources thereat, thereby to assure that resources shall be available to be allocated to the mobile station upon subsequent handover of communications to the target cell.

In these and other aspects, therefore, apparatus, and an associated method, is provided for selecting a target coverage area defined by at least one target, fixed-site transceiver forming a portion of a radio communication system. The radio communication system includes a plurality of spaced-apart, fixed-site transceivers positioned throughout a geographic area. Each fixed-site transceiver defines a coverage area within which communications with a mobile station are permitted pursuant to a service subscription. The target coverage area is selected at which to reserve resources to communicate with the mobile station at a selected quality of service level subsequent to handover of communications by a serving, fixed-site transceiver. A resource reserver is coupled to receive an indication of positioning of the mobile station and an indication of a velocity at which the mobile station is traveling. The resource reserver is operable responsive thereto to select the at least one target, fixed-site transceiver at which to reserve the resources and to select when to reserve the resources.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION OF THE PREFERRED EMBODIMENT

Figure 1:
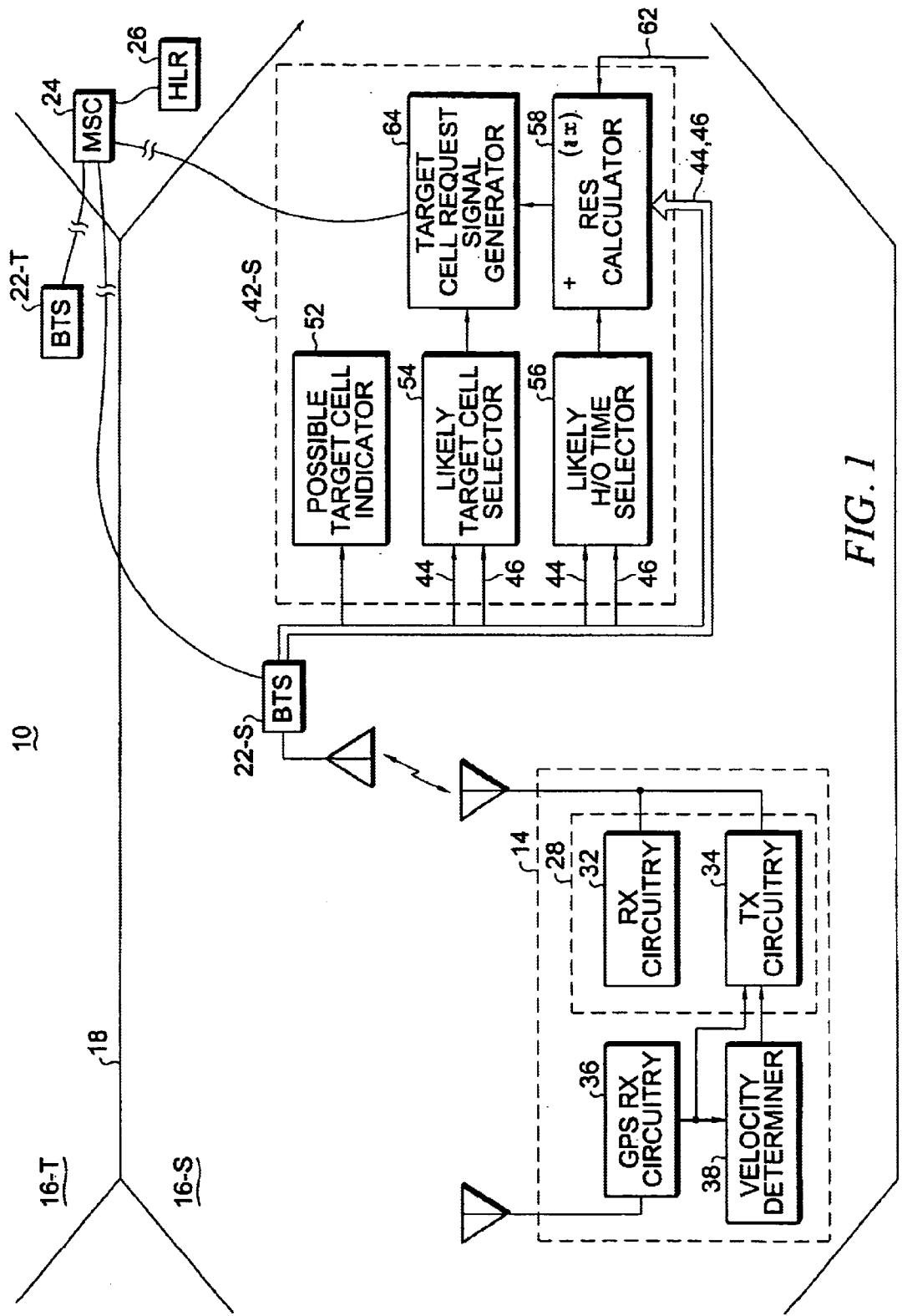
FIG. 1 illustrates a portion of a cellular communication system which includes an embodiment of the present invention as a portion thereof.

Referring first to FIG. 1, a portion of a cellular communication system, shown generally at 10, is installed throughout a geographical area. The cellular communication system 10 permits telephonic communications, of both voice and non-voice data between the network infrastructure 12 and mobile stations, of which the mobile station 14 is exemplary. In the exemplary embodiment illustrated in the figure, the cellular communication system complies with the standards, as presently promulgated, set forth in the IS-2000 specification proposed by the EIA/TIA. Cellular communication systems, and other radio communication systems, can similarly be represented, and an embodiment of the present invention is analogously operable in such other communication systems.

A plurality of cells 16 are defined in the system 10. Here, portions of several cells 16 are shown, including a serving cell 16-S and a portion of a target cell 16-T. The serving and target cells 16-S and 16-T are separated by a boundary 18. Generally, when the mobile station 14 travels out of the serving cell 16-S and into the target cell 16-T, a handover of communications is effectuated to facilitate continued communications with the mobile station.

A Base Transceiver Station (BTS) 22 is associated with each of the cells 16. In the figure, a BTS 22-S is associated with the cell 16-S, and a BTS 22-T is associated with the target cell 16-T. The base transceiver stations 22 are formed of fixed-site transceivers capable of two-way communications with a mobile station, such as the mobile station 14. Communication signals are communicated between the mobile station 14 and a base transceiver station 22 by way of radio communication channels.

The base transceiver stations are coupled to base station controllers (not shown) and, in turn, to Mobile Switching Centers (MSCs), of which the MSC 24 is exemplary. The MSCs are, in turn, coupled, typically, to a public-switched, telephonic network (also not shown). The MSC includes, or is coupled to, an HLR (Home Location Register) 26. The HLR 26 stores, for instance, subscription information related to the service subscriptions pursuant to which mobile stations, such as the mobile station 14, are operable. Service subscription information includes, for instance, a Quality of Service (QoS) level pursuant to which a communication service to be effectuated with the associated mobile station is to be performed. Different types of communication services require different levels of resources to be allocated to effectuate the communication service. And, at subscription levels for different levels of QoS at which the communication service is to be performed, different levels of resources are paid, pursuant to the subscription, to permit such communication services to be effectuated at the subscribed-for QoS level.

As noted above, when a mobile station 14 travels out of a serving cell and into a target cell, a handover of communications is performed to permit continued communications, i.e., continued effectuation of the communication service. However, pursuant to the handover of communications, resources must be made available at the target cell to permit such continued effectuation of the communication service. Conventionally, a best-efforts allocation is attempted to provide resources to the mobile station entering the target cell. That is to say, when a handover is requested, a determination is made as to whether the resources are available at the target cell to continue the communication service at the appropriate QoS level. If resources are not available, either the communication service continues, at a degraded QoS level, or handover is not permitted. If handover is not permitted, and the mobile station continues traveling through the target cell, away from the serving cell, eventually, communication services shall be interrupted. In either event, communication quality is likely to be degraded, or even terminated. Operation of an embodiment of the present invention provides a manner by which better to assure that resources shall be available at the target cell when handover is requested.

The mobile station 14 here includes conventional transceiver circuitry 28 having a receive circuitry portion 32 and a transmit circuitry portion 34. Such transceiver circuitry is operable in conventional manner pursuant to the IS-2000, or other appropriate, standard. The mobile station 14 here further includes GPS (Global Positioning System) receiver circuitry, operable in conventional manner to receive GPS satellite-generated signal, from which to determine the positioning of the mobile station, i.e., obtain a "position fix" therefor. Position fixes determined by the GPS receive circuitry 36 is provided to a velocity determiner 38 and also to the transmit circuitry portion 34 of the transceiver circuitry 28. The velocity determiner is operable, responsive to detection of two position fixes at known times, or at known time intervals, to determine the velocity at which the mobile station is traveling. Indications of the determined velocity are also provided to the transmit circuitry portion 34. In operation of an exemplary embodiment of the present invention, when the transmit circuitry portion generates a Pilot Strength Measurement (PSMM) signal, the velocity and positioning information provided by the determiner 38 and the GPS receive circuitry 36 are appended thereto. The resultant signal, is transmitted upon a radio link to the BTS 22-S, thereby providing the network infrastructure 12 of the communication system with both positional and velocity information related to the mobile station.

The network infrastructure further includes a resource reserver 42 associated with each of the base transceiver stations 22. Here, a resource reserver 42-S is associated with the BTS 22-S. The resource reserver is coupled to receive indications of the positioning of the mobile station as well as the velocity of the mobile station on the lines 44 and 46. The resource reserver is also provided with information, here provided by way of the line 48, relating to the infrastructure of the communication system. More particularly, here, information related to, for instance, neighbor cells of the serving cell 16-S, and their corresponding base transceiver stations, is provided to the resource reserver. Such information is here indicated to be stored at a possible target cell indicator 52.

The resource reserver 42 is shown also to include a likely target cell selector 54. The selector 54 is operable, responsive to application thereto of indications of the position of the mobile station and of the velocity of the mobile station, together with the information provided by the indicator 52, to determine a cell, or cells, likely to form a target cell, or cells, to which a handover of communication shall be requested. If, for instance, the mobile station 14 is traveling in the direction indicated by the arrow 56, the likely target cell selector selects the cell 16-T to be the likely target cell.

The resource reserver further includes a likely handover time selector 56, also coupled to the lines 44 and 46 to receive indications of the positioning and velocity of the mobile station. The selector 56 is operable to select a time at which the mobile station shall likely request a handover from the serving cell 16-S to the target cell 16-T. The likely handover time is, for instance, the time when the mobile station is likely to cross the boundary 18.

The resource reserver further includes a reservation time calculator 58, coupled to receive indications of determinations made by the selector 56 as well as indications of the position and velocity of the mobile station generated on the lines 44 and 46, respectively. The reservation time calculator calculates a time period prior to the likely handover time at which resources should be reserved at the likely target cells, thereby better to assure that resources shall be available at the target cell when a request for handover thereto is requested. The reservation time calculator also calculates a time period, referred to as x, which is a forward-looking time period from the time of receipt of the positioning and velocity information to the time when resources should be reserved. In the exemplary implementation, the reservation time calculator 58 is further coupled to receive system operating characteristics on the line 62. The system operating characteristics form, for instance, load conditions, or other operating characteristics of the cellular communication system, and values representative thereof are utilized in the calculation of the reservation time and associated value x.

The resource reserver also includes a target cell request signal generator 64 coupled to the selector 54 and to the calculator 58. The signal generator 64 is operable to generate a signal to be communicated to the BTS of the likely target cell containing the value of x, thereby to allocate the resources at the target cell prior to request for handover of communications thereto.

Figure 2:
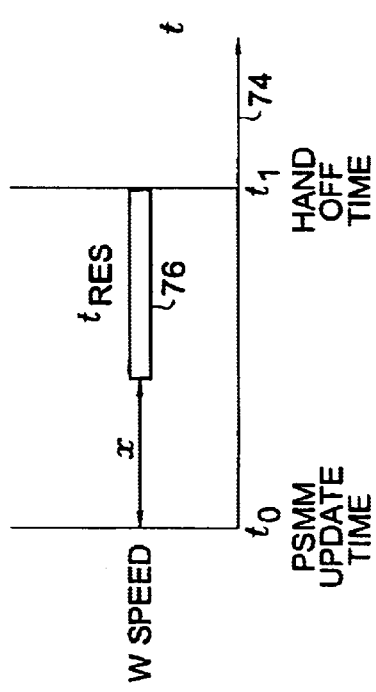
FIG. 2 illustrates a representation, plotted as a function of time, of when resources are reserved at a likely target cell during operation of an embodiment of the present invention.

FIG. 2 illustrates a plot, shown generally 72, as a function of time along the abscissa axis 74. The plot includes a time $t_0$ which is the PSMM signal update time, i.e., the time at which the resource reserver receives the indications of the positioning and velocity information related to the mobile station. Time $t_1$ is a likely handover time at which a request for handover of communications to a target cell is determined to be likely. And, the reservation time $t_{res}$ is plotted to extend prior to the time $t_1$. And, the value x, provided by the resource reserver associated with the serving cell to corresponding structure of the target cell is also shown in the figure.

Figure 3:
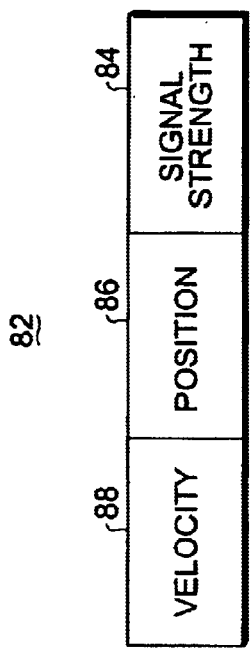
FIG. 3 illustrates an exemplary PSMM (Pilot Strength Measurement) signal generated during operation of an embodiment of the present invention.

FIG. 3 illustrates an exemplary PSMM signal, shown generally at 82, generated by a mobile station during operation of an embodiment of the present invention. The PSMM signal includes a first portion 84 which contains Pilot Strength Measurement signal values and also second and third portions 86 and 88. The second portion of the signal includes an indication of the position of the mobile station, and the third portion 88 includes an indication of the velocity of the mobile station. From such signal, when detected at the resource reserver, a likely target cell and a likely handover time is determinable.

Figure 4:
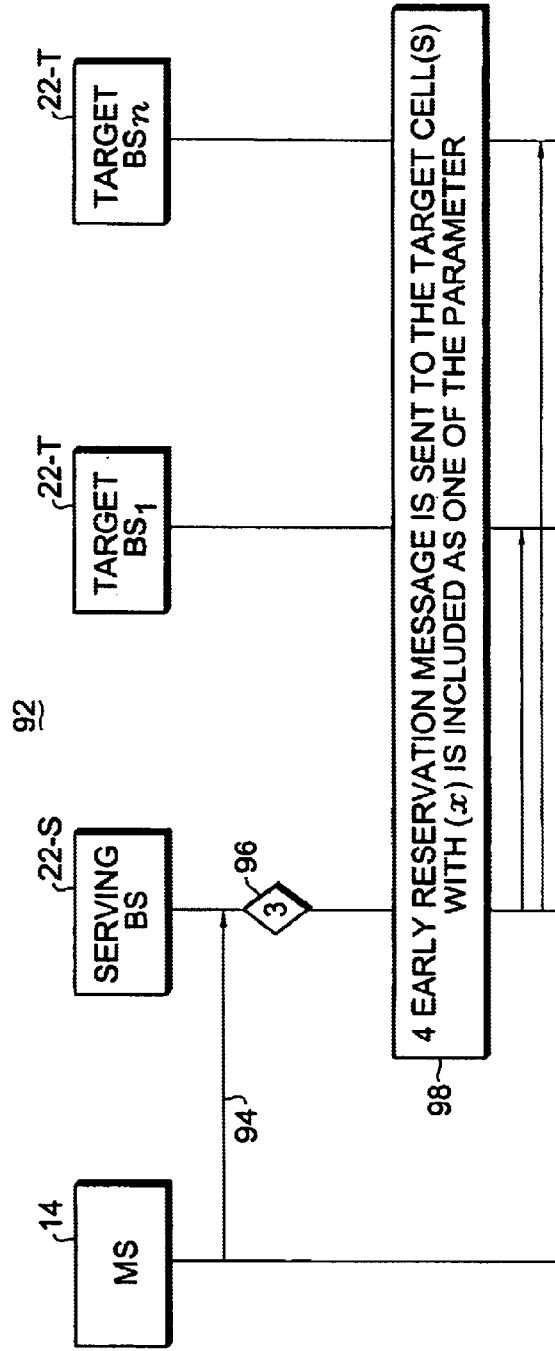
FIG. 4 illustrates a message sequence diagram illustrating an embodiment of the present invention.

FIG. 4 illustrates a message sequence diagram, shown generally at 92, representing signaling generated during operation of the present invention. First, and as indicated by the segment 94, a PSMM signal is generated by the mobile station 14 and communicated to the serving BTS 22-S. The PSMM signal includes indications of the positioning and velocity of the mobile station. Once received, the information is provided to the resource reserver associated with the base transceiver station 22-S and, as indicated at the block 96, the likely target cell is selected and a value of x is calculated. Then, and as indicated by the block 96, a reservation request is sent to the target base station 22-T. Here, more than one target cells are selected so the message is sent to more than one target base stations 22-T. Thereby, resources can be early-allocated at the target cells so that appropriate resources are available to continue effectuation of a communication service at a desired quality of service level when handover of communications is requested. Improved communication quality results.

The previous descriptions are of preferred examples for implementing the invention, and the scope of the invention should not necessarily be limited by this description. The scope of the present invention is defined by the following claims.

We claim:

1. In a radio communication system including a plurality of spaced-apart, fixed-site transceivers positioned throughout a geographic area, each fixed-site transceiver defining a coverage area within which communications with a mobile station are permitted pursuant to a service subscription, an improvement of apparatus for selecting a target coverage area defined by at least one target, fixed-site transceiver at which to reserve resources to communicate with the mobile station at a selected quality of service level subsequent to handover of communications by a serving fixed-site transceiver, said apparatus comprising:

a resource reserver coupled to receive an indication of positioning of the mobile station and an indication of a velocity at which the mobile station is traveling, said resource reserver operable responsive for determining when the handover of communications by the serving fixed-site transceiver is expected to occur, thereto to select the at least one target, fixed-site transceiver at which to reserve the resources and to select when to reserve the resources, at a selected time prior to when the handover of communications is expected to occur, the selected time selected, at least in part, responsive to at least one operational characteristic of the radio communication system, the at least one operational characteristic comprising an indication of the size of the target area.

2. The apparatus of claim 1 wherein said resource reserver is further coupled to reserve an indication of the selected quality of service level at which to communicate with the mobile station subsequent to the handover of communications, said resource reserver further for selecting a level of resources requested to be reserved at the at least one target, fixed-site transceiver to permit the selected quality of service level to be achieve.

3. The apparatus of claim 1 wherein the mobile station provides said resource reserver with the indication of the positioning of the mobile station and with the indication of the velocity at which the mobile station is traveling and wherein said resource receiver selects reservation of the resources at a selected time subsequent to receipt thereof, the selected time subsequent to the receipt corresponding to the selected time prior to when the handover of communications is expected to occur.

4. The apparatus of claim 1 wherein the operational characteristic responsive to which the selected time is selected further comprises a load characteristic of the radio communication system.

5. The apparatus of claim 1 wherein positioning of the mobile station, the indication of which said resource reserver is coupled to receive, is determined at the mobile station.

6. The apparatus of claim 1 wherein the velocity at which the mobile station is traveling, the indication of which said resource reserver is coupled to receive, is determined at the mobile station.

7. The apparatus of claim 1 wherein the radio communication system comprises a network infrastructure, the fixed-site transceivers forming a portion of the network infrastructure, and wherein said resource reserver is located at the network infrastructure.

8. The apparatus of claim 7 wherein said resource reserver is located at the serving, fixed-site transceiver.

9. In the radio communication system of claim 1, a further improvement of apparatus for providing said resource reserver with the indication of the positioning of the mobile station and with the indication of the velocity at which the mobile station is traveling, said apparatus comprising:

a position determiner for determining the positioning of the mobile station;

a velocity determiner coupled to receive determinations made by said position determiner, said velocity determiner operable responsive thereto to determine the velocity at which the mobile station is traveling; and a provider coupled to receive indications of the positioning determined by said position determiner and indications of determinations of the velocity determined by said velocity determiner, said provider for providing the indications to said resource reserver.

10. The apparatus of claim 9 wherein said resource receiver is located at the serving, fixed-site transceiver.

11. The apparatus of claim 10 wherein said position determiner and said velocity determiner are located at the mobile station.

12. The apparatus of claim 11 wherein the mobile station comprises a radio transmitter portion and wherein said provider forms a portion of the radio transmitter portion.

13. The apparatus of claim 12 wherein the radio communication system comprises a cellular communication system operable pursuant to a cellular communication standard in which a pilot signal strength measurement signal is transmitted by the mobile station to the serving fixed-site transceiver and wherein the indications of the positioning and of the velocity are transmitted by the mobile station together with the pilot signal strength measurement signal.

14. In a method for communicating in a radio communication system including a plurality of spaced-apart, fixed-site transceivers positioned throughout a geographic area, each fixed-site transceiver defining a coverage area within which communications with a mobile station are permitted pursuant to a service subscription, an improvement of a method for selecting a target coverage area defined by at least one target, fixed-site transceiver at which to reserve resources to communicate with the mobile station at a selected quality of service level subsequent to handover of communications by serving fixed-site transceiver, said method comprising:

determining positioning of the mobile station;

determining velocity of the mobile station;

determining when the handover of communications by the serving fixed-site transceiver is expected to occur; and selecting, responsive to the positioning of the mobile station, the velocity of the mobile station, and when the handover of communications is expected to occur determined during said operations of determining, the at least one target, fixed-site transceiver at which to reserve the resources and to select when to reserve the resources, at a selected time prior to when the handover of communications is expected to occur, the selected time selecter, at least in part, responsive to at least one operational characteristics of the radio communication system, the at least one operational characteristics comprising an indication of the size of the target area.

15. The method of claim 14 wherein the positioning of the mobile station and the velocity of the mobile station determined during said steps of determining are performed at the mobile station, wherein said operation of selecting is performed at the serving fixed-site transceiver, and wherein the method further comprises the operation of sending indications of the positioning and of the velocity to the serving fixed-site transceiver.

16. In a radio communication system including a plurality of spaced-apart, fixed-site transceivers positioned throughout a geographic area, each fixed-site transceiver defining a coverage area within which communications with a mobile station are permitted pursuant to a service subscription, an improvement of an assembly for facilitating selection of a target coverage area defined by at least one target, fixed-site transceiver at which to reserve resources to communicate with the mobile station at a selected quality of service level subsequent to handover of communications by a serving fixed-site transceiver, said assembly comprising:

a position determiner for determining the positioning of the mobile station;

a velocity determiner coupled to receive determinations made by said position determiner, said velocity determiner operable responsive thereto to determine the velocity at which the mobile station is traveling, the positioning of the mobile station determined by said position determiner and the velocity determined by said velocity determiner together used in the selection of the target coverage area, and a resource reserver coupled to receive an indication of positioning of the mobile station determined by said position determiner and an indication of a velocity at which the mobile station is traveling determined by said velocity determiner, said resource reserver operable responsive thereto to select the at least one target, fixed-site transceiver at which to reserve the resources and to select when to reserve the resources.

17. In the radio communication system of claim 16, said assembly further for selecting the target coverage area, said assembly further comprising:

a resource reserver coupled to receive an indication of positioning of the mobile station determined by said position determiner and an indication of a velocity at which the mobile station is traveling determined by said velocity determiner, said resource reserver operable responsive thereto to select the at least one target, fixed-site transceiver at which to reserve the resources and to select when to reserve the resources, selection of when at which to reserve the resources at selected time period prior to when the handover of communications is requested.

18. In a cellular communication system operable pursuant to a cellular communication standard signal strength and having a plurality of spaced-apart, fixed-site transceivers positioned throughout a geographic area, each fixed-site transceiver defining a coverage area within which communications with a mobile station are permitted pursuant to a service subscription, wherein a pilot signal strength measurement is transmitted by the mobile station to a serving fixed-site transceiver, an improvement of apparatus for selecting a target coverage area defined by at least one target, fixed-site transceiver at which to reserve resources to communicate with the mobile station at a selected quality of service level subsequent to handover of communications by a serving fixed-site transceiver, said apparatus comprising:

a position determiner located at the mobile station, said position determiner for determining positioning of the mobile station;

a velocity determiner located at the mobile station and coupled to receive determinations made by said position determiner, said velocity determiner operable responsive thereto to determine a velocity at which the mobile station is traveling;

a provider embodied at the radio transmitter portion of the mobile station and coupled to receive indications of the positioning and of indications of the velocity, said provider for transmitting the indications of the positioning and of he velocity, together with the pilot signal strength measurement signal; and a radio resource reserver located at the serving fixed-site transceiver, said radio resource reserver coupled to receive the indication of the positioning and the indication of the velocity, said resource reserver operable responsive thereto to select the at least one target, fixed-site transceiver at which to reserve the resources and to select when to reserve the resources.

\* \* \* \* \*